A. F. DONALDSON.
MICROMETER.
APPLICATION FILED JAN. 26, 1917.
1,346,304.
Patented July 13, 1920.
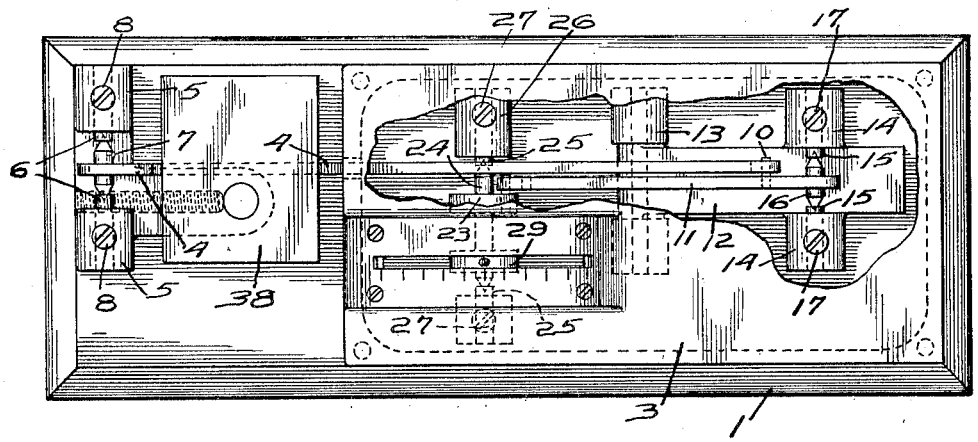
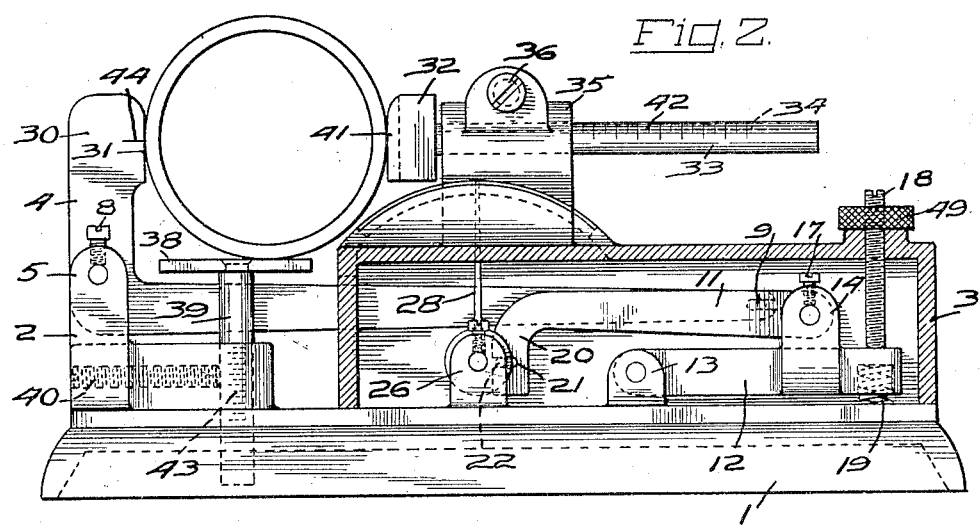
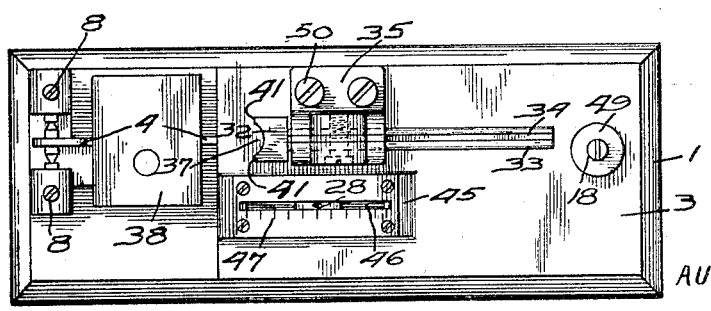
INVENTOR
AUGUSTUS F. DONALDSON

UNITED STATES PATENT OFFICE.

AUGUSTUS F. DONALDSON, OF TOLEDO, OHIO, ASSIGNOR TO THE BUNTING BRASS & BRONZE COMPANY, OF TOLEDO, OHIO, A CORPORATION OF OHIO.

MICROMETER.

1,346,304.  Specification of Letters Patent.  Patented July 13, 1920.

Application filed January 26, 1917. Serial No. 144,584.

*To all whom it may concern:*

Be it known that I, AUGUSTUS F. DONALDSON, a citizen of the United States, and a resident of Toledo, in the county of Lucas and State of Ohio, have invented a certain new and useful Micrometer; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to micrometric indicators.

It has for its object to provide an indicator which will indicate micrometrically the measurements of bodies. It particularly has for its object to indicate the measurements of bodies in so clear and ocular a way that bodies may be measured rapidly and by inexperienced operators. It also has for its object to provide a means which will indicate micrometrical variations from a standard measurement.

The invention may be contained in many forms of construction for calipering and micrometrically measuring bodies or devices of different forms, all of which come within the purview of my claims hereinafter appended. To show the practicability of my invention I have selected one of such constructions as an example and shall describe it hereinafter. The construction selected is illustrated in the accompanying drawings, wherein,—

Figure 1 is a top view of the device having an adjustable head removed for purposes of illustration. Fig. 2 is a longitudinal sectional view of the device, and Fig. 3 is a top view of the device, though in measurements somewhat reduced from those which are shown in Figs. 1 and 2.

1, Fig. 1, is a supporting base on which the parts are mounted. On one end of the base is located a bracket 2 which may be formed from a part of the base. A large part of the base is covered by a housing 3, which may be secured to the base in any suitable manner. A bell crank lever 4 is supported between ears 5 of the bracket 2 by adjustable pins 6 having countersunk recesses which coact with the pointed pin 7 to form a bearing for the lever 4. The pins 6 may be secured in their adjusted positions by means of screws 8 located in the ears 5. The bell crank lever 4 extends into the housing 3. The end of the bell crank lever 4 located within the housing is provided with a slot 9 in which is located a pin 10 secured in a lever 11. The lever 11 is supported in an adjustable bearing. In the form of the invention shown the lever 11 is supported on a lever or arm 12 Fig. 2 which is pivoted between a pair of lugs or ears 13 formed on the base 1. The lever or arm 12 is provided with a pair of ears 14 in which are located a pair of pins 15 having countersunk recesses which receive the ends of the pin 16 and coact therewith to form a supporting bearing for the lever 11. The pins 15 are secured in their adjusted positions by means of screws 17. The position of the lever 12 may be adjusted by means of the screw 18 which is threaded into the top of the casing 3 and presses against the outer end of the lever 12. A spring 19 located in a socket formed in the lower side of the lever 12 and intermediate the end of the lever 12 and the base 1, operates to yieldingly press the lever 12 against the screw 18. By this means the fulcrum or bearing of the lever 11 may be readily raised or lowered without affecting the length of the arm of the lever 4 and without affecting the length of the arm of the lever 11. The lever 11 has a downwardly extending portion 20 which is located at its outer end. The portion 20 is located in proximity to the base 1 and may be used to operate as a stop to limit the downward movement of the lever 11 caused by the weight of its arm and by the weight of the arm of the lever 4, which is connected to the lever 11 through the pin 10. The lever 11 is provided with a slot 21 in which is located a pin 22. The pin 22 is secured in a disk 23. The disk 23 is secured to a shaft or pin 24. The pin 24 is provided with pointed bearings which are supported in recesses located in pins 25. The pins 25 are supported in ears 26 formed on the base 1. The pins 25 may be adjustably secured in position by means of the screws 27. A pointer 28 is connected to the disk 23. In the form of the invention shown this connection is made through a disk 29 in which the pointer 28 is secured, and the disk 29 is secured to the pin 24, which is connected to the disk 23. By this means the pointer 28 is moved by the operation of the lever 11 upon the pin 22 which is secured in the disk 23. By this arrangement movements of the lever 4 are greatly magnified, and exact measurements of variations may be obtained therethrough when the parts are properly adjusted and connected. The lever 11 supported on the fulcrum located on the lever 12 provides a means for exact adjustment with reference to any definite or standard measurement without varying the lengths of the arms of the levers, and yet connections are provided between the levers, which eliminate all loose play, inasmuch as the pins accurately fit the slots to connect the rotatable members together. The lever 11, which extends toward the fulcrum of the lever 4 from the end of the lever 4, positions the pointer 28 in proximity to the work of the operator, that is, it brings the indicator in close proximity to the device or object measured by the micrometer.

The short arm of the bell crank lever 4 is preferably provided with a head portion 30 having an edge 31, which extends at right angles to the base and deviates therefrom only by a very slight movement of the lever 4, which is greatly limited by the connection of the lever 4 with the lever 11, which is in turn connected to the indicator 28. Opposed to the head 30 of the lever 4 is located a head 32 which is secured to a rod 33 having a channel 34. The rod is movable in a bracket 35 located on the housing 3. The bracket 35 is preferably split to provide a clamping means for rigidly locking the rod 33 in position. The bracket 35 may also be provided with a key located in the channel for preventing rotation of the head 32 and the rod 33 in shifting the rod 33 in the bracket 35 to adjust it with reference to the head 30 of the lever 4. The rod 33 is clamped in position in the bracket 35 by means of the screw 36, which extends through the split portions of the bracket 35. The head 32 is channeled, the channel 37 being formed in the head 32 on the side of the head 32 which opposes the head 30 of the lever 4. This provides a two point contact against which the body may be pressed in order to locate it transversely with respect to a line connecting the heads 30 and 32, for if the body is placed angularly between the heads 30 and 32 the measurement obtained will vary according to the angularity of the position in which it is placed. The two edges or contact surfaces which are thus formed by the channel 37 on the head 32 are located in lines which are perpendicular to the base 1.

Intermediate and beneath the heads 30 and 32 is located a plate 38 which is supported parallel with the base by means of a rod 39 which is supported in the bracket 2 or base 1. In the form of the invention shown the bracket 2 forms a part of the base 1. The rod 39 is secured in its adjusted position by means of a screw 40 which extends through the bracket 2 and presses against the rod 39 to secure it in position. The plate 38 is raised or lowered to any desired position according to the character of the article that is to be measured. Likewise the head 32 is placed relative to the head 30, according to the approximate size of the article to be measured, and when the article is inserted on the plate 38 and between the heads 30 and 32, micrometric measurements are indicated by the pointer 28. The edges 31 of the lever 4 and of the adjustable member 32 form lines of contact on opposite sides of the cylindrical objects that are perpendicular to the plate 38. The parallel relation between the plate 38 and the base 1, and the right angular relation between the edges 31 and the edges or ridges 41 of the head 32 to the plate 38 result in measurements which are certain and yet which are micrometric in character, and yet so ocular that the measurements of a great many objects having substantially the same size may be rapidly made. The rod 33 may be provided with a scale 42 and, if desired, standard measurements may be obtained within the limitations of the scale by shifting the scale through the bracket 35 until the desired division of the scale is located at the side of the bracket 35 or within the plane of the side of the bracket. Likewise the rod 39 which supports the plate 38 may be provided with a scale 43 whereby the position of the plate 38 may be readily adjusted with reference to any adjustment of the rod 33. Inasmuch, however, as the edges 31 and 41 are at right angles to the plane of the plate 38, the plate 38 may be varied greatly without altering the measurements indicated by the pointer 28. Preferably, however, the plate 38 is raised to a point when cylindrical bodies are to be measured, so that the horizontal diameter of the cylindrical body will, when extended, pass through a line or mark 44 which is formed on the head 30. The pointer 28 extends to the top of an arcuate housing 45 formed on the top of the housing 3. The housing 45 is provided with a slot 46 through which the pointer 28 may extend. A scale 47 is located beside the slot 46 to indicate the relative extent of movements of the pointer 28. The scale 47 will thus act as exceedingly fine divisions of the scale 42 located on the rod 33, and the pointer will micrometrically indicate subdivisions of the scale 42.

If desired, the head 32 may be located so as to standardize the instrument with reference to any particular article, that is, the head 32 may be placed in a definite position with reference to the head 30 of the lever 4 and the plate 38 may also be correspondingly positioned, particularly where cylindrical bodies are to be measured and so that by reason of the position of the head 32 to the head 30 the pointer 28 will be located at a center point or division of the scale 47. When this has been done variations in measurement of similar articles from the standard may thus be readily detected. Articles of similar character may thus be rapidly slipped in and out between the heads 30 and 32, and their accuracy readily determined by unskilled operators. This results in a great saving in calipering cylindrical bodies, as it requires a skilled artisan to correctly manipulate calipers, allow for spring of calipers, etc. Also, it results in a great saving because of the rapidity with which cylindrical bodies may be measured and brought within the limits of requirements that may be placed on the accuracy of measurements of such devices.

The construction described may be varied by those skilled in the art, and equivalent parts or elements may be substituted in lieu of those described without in any wise varying from the spirit of the invention embodied in the construction described.

I claim:

1. In a micrometer a supporting part, an adjustable member connected to the supporting part and having a pair of vertical ridges, a plate having a broad plane horizontal surface located beneath the ridges for supporting cylindrical bodies having their axes extending in a direction at right angles to the said ridges, a lever pivoted to the supporting part, one arm of the lever having an edge substantially parallel to the ridges and opposing the ridges and located opposite a point between the ridges, means connected to the lever for pressing the said edge toward the said ridges to press the cylindrical bodies against the ridges by the pressure of the edge on the cylindrical bodies, and means connected to the lever for indicating relative movements of the said edge.

2. In a micrometer, a supporting part, a part connected to the supporting part and having a pair of vertical ridges, a lever having a substantially vertical edge located in opposed relation to the said vertical ridges and pivoted on the supporting part, means for yieldingly pressing the vertical edge toward the vertical ridges, a plate located below the vertical edge and ridges for supporting an object so that the axis of the object will be at right angles to the vertical edge and ridges, the said means operating to press the edge against a side of the object and the object against the ridges, and means for indicating the movements of the lever.

3. In a micrometer, the combination of a supporting part, an adjustable member connected to the supporting part having a pair of vertical ridges, a plate having a broad plane horizontal surface located beneath the ridges and at right angles to the ridges for supporting cylindrical bodies, the axis of the cylindrical bodies extending in a direction at right angles to the said ridges, a bell crank lever pivoted below the plate, one arm having an edge normally substantially parallel to the ridges and the other arm extending beneath the plate, means for pressing said edge toward said ridges and additional means connected to the lever for indicating relative movement of the lever.

4. In a micrometer the combination of a supporting base, a stationary member, a lever having on one end an edge normally parallel to an opposing surface of the member, a second lever operating by and extending from near the end of the first lever toward the said edge and a pointer operated by the second lever, a plate located on said base below the said edge and the said member and substantially at right angles to the said edge and the said surface.

5. In a micrometer, the combination of an adjustable member, a lever having an edge normally parallel to the opposing surface of the adjustable member, a second lever connected to and extending from near the end of the first lever toward the said edge, a pointer operated by the second lever, a third lever, the second lever pivoted on the third lever, and means for adjusting the third lever to adjust the second lever relative to the first lever.

6. In a micrometer, the combination of an adjustable member, a lever having an edge normally parallel to the opposing surface of the adjustable member, a second lever connected to and extending from near the end of the first lever toward the said edge, a pointer operated by the second lever, a third lever, the second lever pivoted on the third lever, a spring for raising one end of the third lever, and an adjustable stop for adjusting the position of the third lever to adjust the second lever relative to the first lever.

7. In a micrometer, the combination of an adjustable stationary member, a bell crank lever extending under the stationary member and having an edge normally substantially parallel to an opposing surface of the adjustable member, a second lever connected to and extending from near the end of the first lever toward the said edge, a pointer operated by the second lever, a third lever, the second lever pivoted on the third lever, a spring for raising one end of the third lever, and an adjustable stop for adjusting the position of the third lever to adjust the second lever relative to the first lever.

8. In a micrometer, the combination of a supporting base, a member having a pair of parallel ridges, a rod having a scale connected to the member, means for securing the rod in adjusted positions, a lever having an edge opposing the ridges, a pointer operated by the lever, an arcuate scale in proximity to the pointer, the divisions of the arcuate scale corresponding to subdivisions of the first named scale, a plate located below and at right angles to the edge and ridges, a rod for supporting the plate, means for securing the rod and plate in adjusted positions, the rod having a scale for indicated adjustment of the plate relative to the adjustment of the member, the divisions of the third scale corresponding to the divisions of the first named scale.

9. In a micrometer, the combination of a supporting base, a member having a pair of ridges, a rod connected to the member and having a scale, means for securing the member and rod in adjusted positions, a bell crank lever extending under the member and rod and having an edge normally located parallel to the ridges, a plate located in a plane at right angles to the ridges and edge and supported by a rod having a scale like the scale on the first named rod, means for securing the plate in adjusted positions, a second lever operated by the first lever and extending from near the end of the first lever toward the fulcrum of the first lever, a third lever for supporting the second lever, means for adjusting the third lever relative to the first lever, a pointer operated by the second lever, and an arcuate scale located in proximity to the pointer having the subdivisions of the scale of the first named rod.

10. In a micrometer a supporting part, an adjustable member connected to the supporting part and having a pair of vertical ridges, a plate having a broad plane horizontal surface located beneath the ridges and at right angles to the ridges for supporting cylindrical bodies having their axes extending in a direction at right angles to the said ridges, a lever pivoted to the supporting part, one arm of the lever having an edge substantially parallel to the ridges and opposing the ridges and located opposite a point between the ridges, means connected to the lever for pressing the said edge toward the said ridges to press the cylindrical bodies against the ridges by the pressure of the edge on the cylindrical bodies, the upper ends of the ridges and edge terminating in parts that slope away from a point between the ridges on one side and the edge on the other.

In testimony whereof I have hereunto signed my name to this specification.

AUGUSTUS F. DONALDSON.